US012730428B2

(12) United States Patent
Kaihara

(10) Patent No.: US 12,730,428 B2
(45) Date of Patent: Sep. 8, 2026

(54) NUMERICAL VALUE CONTROL DEVICE

(71) Applicant: FANUC CORPORATION, Yamanashi (JP)

(72) Inventor: Kenji Kaihara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 424 days.

(21) Appl. No.: 18/261,560

(22) PCT Filed: Jan. 25, 2022

(86) PCT No.: PCT/JP2022/002612
§ 371 (c)(1),
(2) Date: Jul. 14, 2023

(87) PCT Pub. No.: WO2022/163633
PCT Pub. Date: Aug. 4, 2022

(65) Prior Publication Data

US 2024/0310807 A1 Sep. 19, 2024

(30) Foreign Application Priority Data

Feb. 1, 2021 (JP) ................................ 2021-014596

(51) Int. Cl.
*G05B 19/18* (2006.01)
*B23Q 15/22* (2006.01)

(52) U.S. Cl.
CPC .......... *G05B 19/182* (2013.01); *B23Q 15/22* (2013.01); *G05B 2219/45215* (2013.01)

(58) Field of Classification Search
None
See application file for complete search history.

(56) References Cited

U.S. PATENT DOCUMENTS 5,005,135 A * 4/1991 Morser ............... G05B 19/373 700/193
5,076,744 A * 12/1991 Kitagawa ............ G05B 19/186 409/71

(Continued)

FOREIGN PATENT DOCUMENTS

CN 106853596 A 6/2017
CN 207696025 U 8/2018

(Continued)

OTHER PUBLICATIONS

International Search Report issued in PCT/JP2022/002612; mailed Apr. 5, 2022.

*Primary Examiner* — Jennifer L Norton
(74) *Attorney, Agent, or Firm* — Studebaker Brackett PLLC

(57) ABSTRACT

Provided is a numerical value control device capable of easily setting an effective diameter for a machined circle. The numerical value control device is equipped with a command unit which prescribes a machined circle standard or a proportion of the tolerance class to the machined circle tolerance in a machining program for machining a circle using a machine tool, and also equipped with a setting unit for setting a correction amount for the effective diameter of the machined circle on the basis of the machined circle standard or the proportion of the tolerance class to the machined circle tolerance.

6 Claims, 7 Drawing Sheets

(56) References Cited

U.S. PATENT DOCUMENTS 5,104,268 A * 4/1992 Kitagawa ............. G05B 19/186 409/71
5,453,933 A * 9/1995 Wright ................. G05B 19/414 700/181
5,827,020 A * 10/1998 Fujita ................. G05B 19/4163 409/80
6,242,880 B1 * 6/2001 Hong ................... G05B 19/416 700/189
12,564,913 B2 * 3/2026 Kaihara ............. B23Q 17/2233
12,583,071 B2 * 3/2026 Uenishi .................. B23Q 15/16
2003/0050726 A1 * 3/2003 Jaffrey .................... G16Z 99/00 700/182
2004/0193385 A1 * 9/2004 Yutkowitz ............ G05B 19/404 702/151
2010/0245843 A1 * 9/2010 Studer .................. G01B 11/245 356/601
2012/0065769 A1 * 3/2012 Knaupp .................... B24C 9/00 700/193
2013/0222580 A1 * 8/2013 Kurahashi .......... G01B 11/2433 348/135
2016/0187866 A1 * 6/2016 Noda ................. G05B 19/4093 700/187
2017/0113369 A1 * 4/2017 Chiu ...................... B26D 5/005
2017/0160716 A1 * 6/2017 Nagayama ....... G05B 19/40937
2018/0088554 A1 * 3/2018 Suzuki ................. G05B 19/404
2019/0025794 A1 * 1/2019 Matsumura .......... G05B 19/404
2020/0209826 A1 * 7/2020 Chang .................. G05B 19/402
2020/0401115 A1 * 12/2020 Liang ................. G05B 19/4166
2021/0072724 A1 * 3/2021 Liang ................... G05B 19/408
2023/0158624 A1 * 5/2023 Uenishi .................. B23Q 17/22 700/159
2023/0350375 A1 * 11/2023 Uenishi ................ B23Q 15/007

FOREIGN PATENT DOCUMENTS

JP H03-186606 A 8/1991
JP H04-503877 A 7/1992
JP H04-352006 A 12/1992
JP H09-006423 A 1/1997
JP 2002-283230 A 10/2002
JP 2005-224942 A 8/2005
JP 2017-071047 A 4/2017
WO 2015/145569 A1 10/2015

* cited by examiner

FIG. 3

EXAMPLE OF G-CODE

{G102 / G103} {G41 / G42} {G17 / G18 / G19} I C R A {X / Y / Z} Q D F E P J K L

| | ARGUMENT | REFERENCE VALUE |
|---|---|---|
| ESSENTIAL | I: RADIUS OF CIRCLE TO BE MACHINED (mm) | – |
| OPTIONAL | G1: TOOL DIAMETER COMPENSATION | – |
| | G2: SELECTION OF PLANE | – |
| | C: STARTING POINT (deg) | – |
| | R: ENGAGEMENT, RETRACTION RADIUS (mm) | 50% |
| | A: APPROACHING ANGLE(deg) | 90deg |
| | XYZ: HELICAL MOVEMENT(mm) | – |
| | Q: PITCH IN X, Y, AND Z DIRECTIONS(mm) | – |
| | D: TOOL DIAMETER COMPENSATION(NUMBER) | – |
| | F: FEEDING SPEED FOR MACHINING(mm/min) | – |
| | E: APPROACHING SPEED(mm/min) | 30,000 |
| | P: STANDARD OF CIRCLE TO BE MACHINED | – |
| | J: RATIO OF COMPENSATION AMOUNT | 50% |
| | K: TOLERANCE CLASS | – |
| | L: RATIO OF TOLERANCE | 50% |

EXAMPLE OF G-CODE

G102 G42 I3.0 C45 Z-10.0 Q1.0 D1 P2 F100

| OLD JIS GRADE | FEMALE THREAD | | MALE THREAD | |
|---|---|---|---|---|
| | ISO GRADE | INSTRUCTED ARGUMENT | ISO GRADE | INSTRUCTED ARGUMENT |
| GRADE 1 | 4H(M1.4 OR LESS)<br>5H(M1.6 OR MORE) | P1 | 4h | P-1 |
| GRADE 2 | 4H(M1.4 OR LESS)<br>6H(M1.6 OR MORE) | P2 | 6h(M1.4 OR LESS)<br>6g(M1.6 OR MORE) | P-2 |
| GRADE 3 | 7H | P3 | 8g | P-3 |

| NOMINAL DIAMETER(1x2) | PITCH(Q) | FEMALE THREAD STANDARD(P) | FEMALE THREAD COMPENSATION AMOUNT | MALE THREAD STANDARD(P) | MALE THREAD COMPENSATION AMOUNT |
|---|---|---|---|---|---|
| mm | mm | | μm | | μm |
| M6 | 1.0 | 5H(EQUIVALENT TO OLD JIS GRADE 1) | +118~0 | 4h | 0~-71 |
| | | 6H(EQUIVALENT TO OLD JIS GRADE 2) | +150~0 | 6g | -26~-138 |
| | | 7H(EQUIVALENT TO OLD JIS GRADE 3) | +190~0 | 8g | -26~-206 |
| | 1.25 | 5H | +125~0 | 4h | 0~-75 |
| | | 6H | +160~0 | 6g | -28~-146 |
| | | 7H | +200~0 | 8g | -26~-218 |

| | | VALUES OF INSTRUCTED ARGUMENT(K) | | | | | | | |
|---|---|---|---|---|---|---|---|---|---|
| | | 1.1 | 1.2 | 2.1 | 2.2 | 2.3 | 2.4 | 2.5 | 2.6 |
| DIMENSIONAL RANGE(mm) | | STANDARD FOR HOLES | | | | | | | |
| GREATER THAN | EQUAL TO OR LESS THAN | G6 | G7 | H5 | H6 | H7 | H8 | H9 | H10 |
| 3 | 6 | 12~4 | 16~4 | 5~0 | 8~0 | 12~0 | 18~0 | 30~0 | 48~0 |
| 6 | 10 | 14~5 | 20~5 | 6~0 | 9~0 | 15~0 | 22~0 | 36~0 | 58~0 |
| 10 | 14 | 17~6 | 24~6 | 8~0 | 11~0 | 18~0 | 27~0 | 43~0 | 70~0 |
| 14 | 18 | 20~7 | 28~7 | 9~0 | 13~0 | 21~0 | 33~0 | 52~0 | 84~0 |

UNIT [μm]

NUMERICAL VALUE CONTROL DEVICE

TECHNICAL FIELD

The present invention relates to a numerical control device.

BACKGROUND ART

Threading is generally performed by machining in synchronization of rotation and axial movement of a spindle or helical tapping using a cutting tool having a threaded cutting edge.

Conditions of tools used for the threading are determined by referring to catalogs provided by tool manufacturers. For the helical tapping, it is necessary to change the set values for compensation of diameters of circles to be machined, tool diameter, etc. according to the standards of female and male threads. A technique of using a compensation machining program for compensation of the diameters of the circles to be machined, the tool diameter, etc. has been known (see, e.g., Patent Document 1).

Patent Document 1: Japanese Unexamined Patent Application, Publication No. 2005-224942

DISCLOSURE OF THE INVENTION

Problems to be Solved by the Invention

Although the threading by the existing helical tapping is performed taking the diameter or radius of the cutting tool into account by referring to the catalog of the tool manufacturer, the obtained thread may not conform to the required grade. This is because the cutting tool for the helical tapping is manufactured without reflecting the compensation amount corresponding to the tolerance described in the grade-based standards on its diameter so that users can flexibly change the tool grade in the machining.

Thus, for the helical tapping, it is necessary to change the tool diameter in view of the diameter of the circle to be machined on which the compensation amount corresponding to the tolerance described in the standards based on the grades of the female and male threads is reflected, and check of the compensation amount is also required with respect to the diameter of the thread to be machined and the required grade. As for the standards for the threads, Japanese Industrial Standards (JIS) are generally used and include a tolerance for an outer diameter, an inner diameter, or an effective diameter as a reference.

When an end mill is used for circular machining to provide a hole and a shaft in a designated fit, the diameters of the hole and the shaft to be machined need to be set taking the deviations of the hole and the shaft in commonly used fits into account. Thus, the machining requires not only the compensation for the diameter of the end mill, but the compensation amount checked and set based on the predetermined tolerance. The fit is generally based on the deviations of holes or shafts in commonly used fits according to JIS. Hence, there has been a demand for a numerical control device that can easily set the outer diameter, inner diameter, or effective diameter of a circle to be machined.

Means for Solving the Problems

A numerical control device of the present disclosure includes: an instruction unit that instructs a standard or tolerance class of a circle to be machined and a ratio of a tolerance of the circle to be machined in a machining program that causes a machine tool to perform circular machining; and a setting unit that sets a compensation amount of an effective diameter of the circle to be machined based on the standard or tolerance class of the circle to be machined and the ratio of the tolerance of the circle to be machined.

Effects of the Invention

The present invention allows easy setting of an outer diameter, inner diameter, or effective diameter of a circle to be machined.

BRIEF DESCRIPTION OF THE DRAWINGS

FIG. 3 is a view illustrating a specific example of a machining program;

FIG. 5 is a view of an example of a data table;

FIG. 7 is a view of an example of a tolerance table.

PREFERRED MODE FOR CARRYING OUT THE INVENTION

Figure 1:
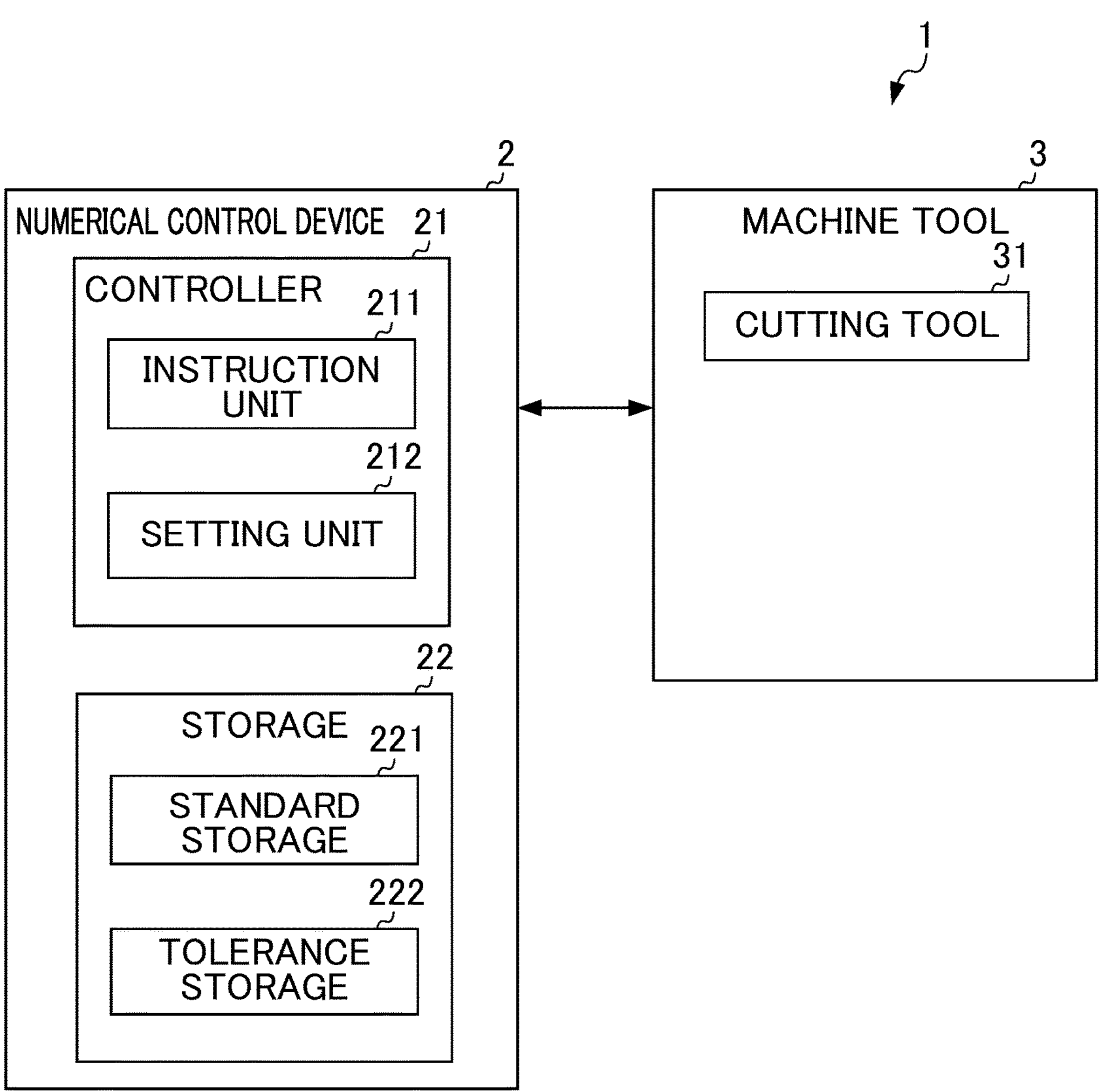
FIG. 1 is a view illustrating a configuration of a machining system of the present embodiment.

Embodiments of the present invention will be described below. FIG. 1 is a view illustrating a configuration of a machining system 1 of the present embodiment. As shown in FIG. 1, the machining system 1 includes a numerical control device 2 and a machine tool 3.

The numerical control device 2 controls the machine tool 3 so that the machine tool 3 performs predetermined machining or any other processes. The numerical control device 2 includes a controller 21. The controller 21 is a processor such as a central processing unit (CPU), and functions as an instruction unit 211 and a setting unit 212 by executing programs stored in a storage (not shown).

The storage 22 is a storage device, such as a read only memory (ROM) that stores an operating system (OS) and application programs, a random access memory (RAM), and a hard disk drive and a solid state drive (SSD) that store various types of information. The storage 22 includes a standard storage 221 and a tolerance storage 222.

The machine tool 3 is a device that performs predetermined machining such as cutting or measures tools in accordance with control by the numerical control device 2. Specifically, the machine tool 3 of the present embodiment is a threading device.

The machine tool 3 includes a motor that is driven for the machining of a workpiece W, a spindle and a feed shaft attached to the motor, jigs and tools corresponding to the shafts, and a table for fixing the workpiece. The machine tool 3 drives the motor based on an operation command outputted from the numerical control device 2 to perform threading or circular machining. The machine tool 3 also includes a cutting tool 31 for the threading or circular machining.

The threading is a machining process of providing a male or female thread with a workpiece that requires a thread using the cutting tool 31. Specifically, the threading in a machining center, for example, is achieved by tapping and helical tapping. The tapping is performed by synchronizing the rotation of a spindle equipped with a cutting tool and the movement of the spindle in the axial direction of the tool with a thread pitch taken into account. The helical tapping is performed by a helically moving a rotating spindle equipped with a cutting tool having a cutting edge having a threaded cross section with a thread pitch taken into account.

When the helical tapping is selected to create the threads, for example, the machine tool 3 performs external threading by milling an outer side of a workpiece to create a male thread and performs internal threading by milling an inner side of the workpiece to create a female thread.

By the circular machining, a milling tool such as an end mill is used as the cutting tool 31 to form a hole or a shaft. For example, the machine tool 3 cuts the inner side of the workpiece to form the hole and cuts the outer side of the workpiece to form the shaft.

The numerical control device 2 performs control using a machining program for the threading or the circular machining by the helical tapping so that the machine tool 3 performs the threading or the circular machining. The machining program includes, for example, G-codes for performing the helical machining or the circular machining and parameters.

The operation of the numerical control device 2 of the present embodiment will be described below. The standard storage 221 stores, as data tables 2211 and 2212 described later, for example, a radius of a circle to be machined (argument I), a pitch of the circle to be machined (argument Q), and a compensation amount of an outer diameter, inner diameter, or effective diameter of the circle to be machined according to a standard of the circle to be machined (argument P) in association with each other.

The tolerance storage 222 stores, as a tolerance table 2221 described later, for example, the radius of the circle to be machined (argument I), a tolerance class of the circle to be machined (argument K), and the tolerance of the circle to be machined in the tolerance class of the circle to be machined (argument K) in association with each other.

The instruction unit 211 instructs the argument in the machining program for causing the machine tool 3 to perform the threading by the helical tapping. Specifically, the instruction unit 211 instructs at least the radius of the circle to be machined (argument I), the pitch of the circle to be machined (argument Q), the standard of the circle to be machined (argument P which will be described later), and the ratio of the tolerance of the circle to be machined (argument L described later). The instruction unit 211 may instruct other arguments described later in the machining program.

The setting unit 212 sets the compensation amount of the effective diameter of the circle to be machined based on the radius of the circle to be machined (argument I), the pitch of the circle to be machined (argument Q), the standard of the circle to be machined (argument P), and the ratio of the tolerance of the circle to be machined (argument L).

The setting unit 212 reads the compensation amount of the outer diameter, inner diameter, or effective diameter of the circle to be machined associated with the radius of the circle to be machined (argument I), the pitch of the circle to be machined (argument Q), and the standard of the circle to be machined (argument P) from the standard storage 221 and sets the read compensation amount of the effective diameter of the circle to be machined.

The instruction unit 211 instructs the radius of the circle to be machined (argument I) and the tolerance class of the circle to be machined (argument K) as the arguments in the machining program for the circular machining to form a hole or a shaft with the machine tool 3, and the setting unit 212 reads the tolerance of the circle to be machined associated with the radius of the circle to be machined (argument I) and the tolerance class of the circle to be machined (argument K) from the tolerance storage 222.

The setting unit 212 reads the tolerance of the circle to be machined associated with the radius of the circle to be machined (argument I) and the tolerance class of the circle to be machined (argument K) from the tolerance storage 222 and sets the read tolerance of the circle to be machined.

The instruction unit 211 can instruct a ratio of the tolerance of the circle to be machined (argument L which will be described later) as the argument in the same block of the machining program. The setting unit 212 sets the compensation amount of the outer diameter, inner diameter, or effective diameter of the circle to be machined or the tolerance of the circle to be machined based on the ratio of the tolerance of the circle to be machined (argument L which will be described later). The setting unit 212 then sets the compensation amount of the effective diameter of the circle to be machined based on the read tolerance of the circle to be machined and the ratio of the tolerance of the circle to be machined (argument L).

Figure 2:
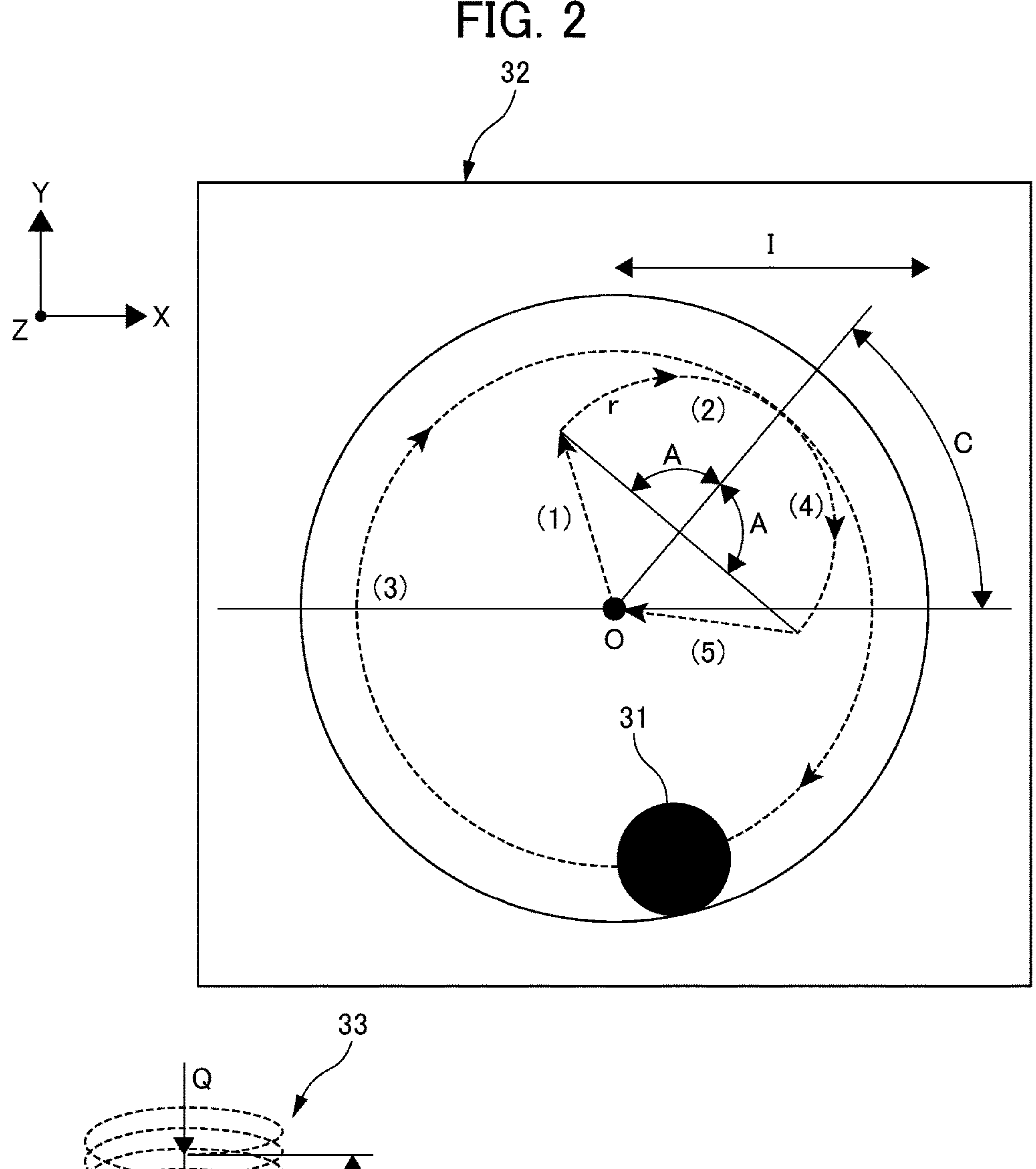
FIG. 2 is a view schematically illustrating circular machining performed by a machine tool of the present embodiment.

FIG. 2 is a view schematically illustrating the circular machining performed by the machine tool 3 of the present embodiment. The machine tool 3 performs the circular machining of a workpiece 32 using a cutting tool 31 by the following processes (1) to (4) of:

(1) moving (approaching) the cutting tool 31 toward the workpiece 32;

(2) moving the cutting tool 31 into the workpiece 32;

(3) cutting the workpiece 32 with the cutting tool 31;

(4) moving the cutting tool 31 out of the workpiece 32; and (5) moving (bringing) the cutting tool 31 away from the workpiece 32. In FIG. 2, reference character O represents a starting point, reference character (argument) I represents the radius of the circle to be obtained, reference character (argument) A represents an angle of the cutting tool 31 approaching the workpiece, and reference character (argument) C represents an angle of the starting point relative to a reference line. In FIG. 2, the starting point O corresponds to reference character (argument) XY.

Reference character 33 in FIG. 2 indicates a machining path of the cutting tool 31 during the helical tapping. Reference characters (arguments) X, Y, and Z indicate helical movement of the cutting tool 31 in the X, Y, and X directions perpendicular to a specified plane, i.e., distances traveled on the specified plane. Reference character (argument) Q indicates the pitch of the cutting tool 31 in the X, Y, and Z directions.

FIG. 3 is a view illustrating a specific example of the machining program. In the machining program, G102 is a G-code of a machining cycle of clockwise circular cutting, and G103 is a G-code of a machining cycle of counterclockwise circular cutting. G41 represents that the tool diameter of the cutting tool 31 is compensated to the left with respect to the cutting direction, and G42 represents that the tool diameter is compensated to the right with respect to the cutting direction.

In the machining program, G17 represents that an XY plane is selected as a plane on which the cutting is done by the cutting tool 31, G18 represents that a ZX plane is selected as the plane on which the cutting is done by the cutting tool 31, and G19 represents that a YX plane is selected as the plane on which the cutting is done by the cutting tool 31.

One of G102 or G103 is selected to create the machining program. None or one of G41 and G42 is selected to create the machining program. None or one of G17, G18, and G19 is selected to create the machining program.

In the machining program, the argument I represents the radius of the circle to be machined by the cutting tool 31, and the argument F represents the feeding speed of the cutting tool 31 during the cutting. The argument I is an essential parameter and indicates in FIG. 2 that a value of the radius of the cutting tool 31 is applied as the amount of tool diameter compensation. When the argument F is not instructed, the feeding speed just previously instructed is used as the argument F.

In the machining program, the argument G1 includes G41 and G42 for the tool diameter compensation, and the argument G2 includes G17, G18, and G19 for the selection of the plane on which the cutting is done by the cutting tool 31. The argument C represents the starting point by angle. The argument R represents a radius of a path of the cutting tool 31 moving into and out of the workpiece 32.

The argument A represents the angle of the cutting tool 31 approaching the workpiece. The arguments X, Y, and Z represent helical movements of the cutting tool 31 in the X, Y, and Z directions perpendicular to a specified plane, i.e., distances traveled on the specified plane. The arguments X, Y, and Z are set according to G17 (select the XY plane), G18 (select the XZ plane), and G19 (select the YZ plane).

The argument Q represents the pitch of the cutting tool 31 in the X, Y, and Z axis directions, i.e., indicates that the helical machining is successively performed in the axial direction perpendicular to the selected plane for the number of times equal to a value obtained by dividing the difference between the value in the specified axial direction and the position where the command is executed by the pitch. The argument D represents the tool diameter compensation (number) of the cutting tool 31, and the argument E represents the approaching speed of the cutting tool 31 and is set to be a rapid traverse rate unless instructed.

The above-described arguments other than the argument I are parameters that are optionally set. For example, the argument A is 90 degrees unless instructed, and the argument C is 0 degree unless instructed. If no instruction is given, the argument R will be 50% of the argument I, and the argument E will be a rapid traverse rate of 30,000 (mm/min) set for the machine tool 3.

The argument P represents the standard of the circle to be machined, the argument K represents the tolerance class of the circle to be machined, and the argument L represents the ratio of the tolerance of the circle to be machined. If no instruction is given, each of the arguments K and L will be 50% of the difference between the maximum and minimum values of the compensation amount based on the standard and the tolerance.

Figure 4:
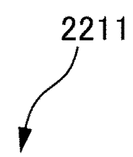
FIG. 4 is a view illustrating an example of G-codes and industrial standards corresponding to argument P.

FIG. 4 is a view illustrating an example of the G-code and industrial standards corresponding to the argument P. The example of the G-code shown in FIG. 4 corresponds to the example of the machining program shown in FIG. 3. Specifically, one of G102 or G103 is selected in the example of the G-code shown in FIG. 4. The arguments I, Z, Q, D, P, and F are instructed in the example of the G-code shown in FIG. 4.

A data table 2211 shown in FIG. 4 stores grades of male and female threads in the industrial standards in association with the instructed arguments.

For example, for a female thread having a nominal diameter (argument I×2) of M6 and a pitch (argument Q) of 1.0, the setting unit 212 refers to the data table 2211 and reads International Organization for Standardization (ISO) grade 6H associated with the argument P2. Although the ISO grade 4H is also associated with the argument P2 in the data table 2211, the ISO grade 6H associated with the nominal diameter M6 (i.e., M1.6 or more) is read in this case.

FIG. 5 is a view of an example of the data table 2212. As shown in FIG. 5, the data table 2212 stores the nominal diameter (argument I×2), the pitch (argument Q), the standard of the circle to be machined (argument P), and the compensation amount of the effective diameter of the circle to be machined in association with each other.

The setting unit 212 refers to the data table 2212 shown in FIG. 5 and reads the compensation amount of the effective diameter of the circle to be machined associated with the radius of the circle to be machined (argument I), the pitch of the circle to be machined (argument Q), and the standard of the circle to be machined (argument P) from the data table 2212. Then, the setting unit 212 sets the read compensation amount of the effective diameter of the circle to be machined.

Specifically, in the example of the G-code shown in FIG. 4, the argument I is 3.0, the argument Q is 1.0, and the argument P is 2. Thus, the nominal diameter (argument I×2) is M6, the pitch is 1.0, and the standard of the circle to be machined (ISO grade) is 6H.

The setting unit 212 reads the compensation amount+150 to 0 (μm) associated with the nominal diameter, pitch, and standard of the circle to be machined from the data table 2212. The setting unit 212 adds+75 (μm), which is the compensation amount of the effective diameter of the circle to be machined and is 50% of the difference between the maximum and minimum values of the read compensation amount+150 to 0 (μm) unless instructed, to the values of tool diameter compensation (arguments G42 and D) based on the argument L which is the ratio of the tolerance of the circle to be machined.

Figure 6:
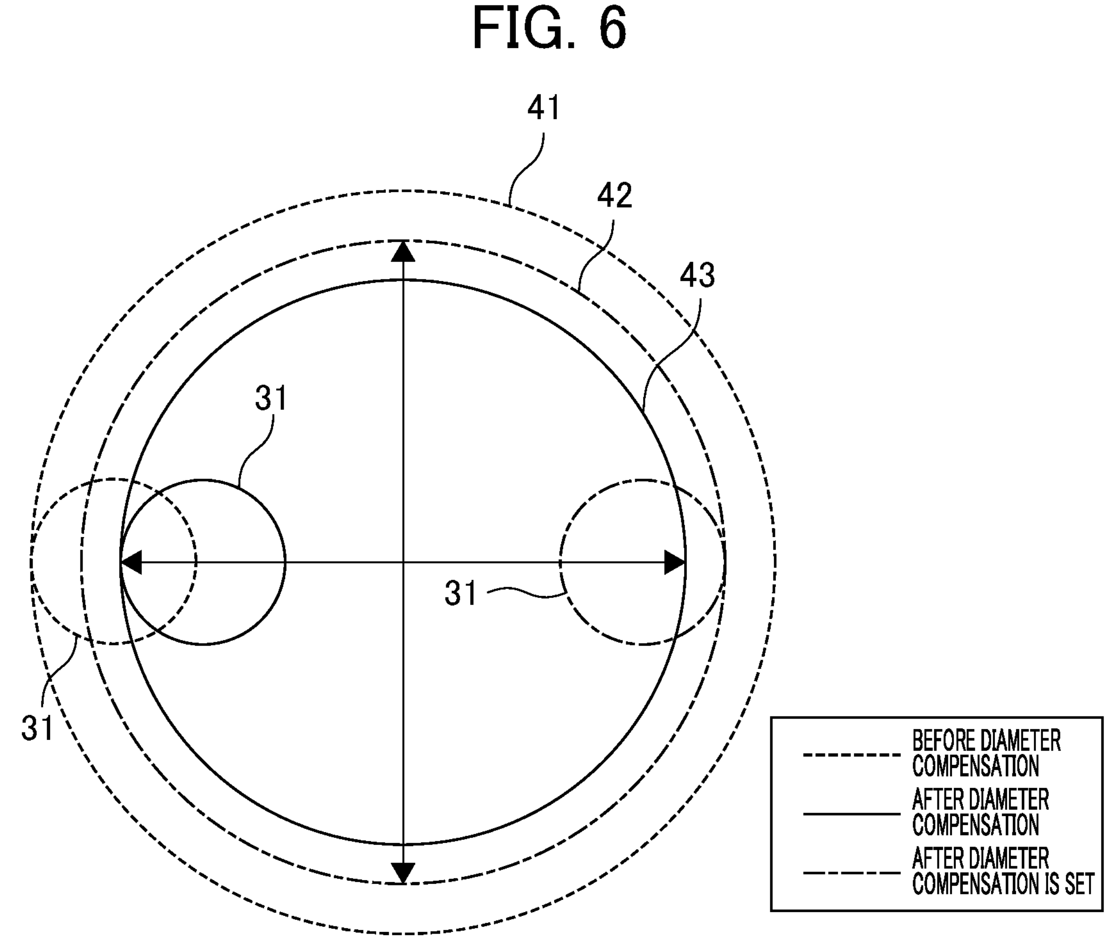
FIG. 6 is a view illustrating an example of a compensation amount of an effective diameter of a circle to be machined set by a setting unit.

FIG. 6 is a view illustrating an example of the compensation amount of the effective diameter of the circle to be machined set by the setting unit 212. Before the tool diameter compensation is done, the machining program is instructed to perform the circular machining with the cutting tool 31 along the circle to be machined 41 before the tool diameter compensation shown in FIG. 6.

When the tool diameter compensation is instructed by the argument G1 in the machining program, the circular machining is performed by the cutting tool 31 along the circle to be machined 42 after the tool diameter compensation. In the example shown in FIG. 6, the tool diameter compensation makes the diameter of the circle to be machined 42 after the tool diameter compensation smaller than the diameter of the circle to be machined 41 before the tool diameter compensation. Specifically, when the tool diameter compensation is instructed by the argument G1 in the machining program, the cutting tool 31 is disposed radially inward of the workpiece than the position of the cutting tool before the tool diameter compensation.

When the compensation amount of the effective diameter of the circle to be machined is set in the machining program by the setting unit 212, the circular machining is performed by the cutting tool 31 along the circle to be machined 43 after setting the compensation amount of the effective diameter of the circle to be machined.

In the example shown in FIG. 6, when the compensation amount is +150 to 0 (μm) as in the example of FIG. 5, for example, the setting of the compensation amount of the effective diameter makes the diameter of the circle to be machined 43 larger than the diameter of the circle to be machined 42 after the tool diameter compensation. Specifically, when the compensation amount is set in the machining program, the cutting tool 31 is disposed radially outward of the workpiece than the position of the cutting tool after the tool diameter compensation.

Thus, the numerical control device 2 of the present embodiment can set the compensation amount depending on the accuracy of the industrial standards such as JIS and ISO by setting the compensation amount of the effective diameter of the circle to be machined with the setting unit 212.

As described above, the setting unit 212 sets the compensation amount of the effective diameter of the circle to be machined based on the ratio of the compensation amount of the effective diameter of the circle to be machined (argument J). Specifically, when the compensation amount of the effective diameter of the circle to be machined is +150 to 0 (μm) and the ratio of the compensation amount of the effective diameter of the circle to be machined (argument J) is 40 (1), for example, the setting unit 212 sets the compensation amount of the effective diameter of the circle to be machined to 150×0.4=60 (μm).

FIG. 7 shows an example of a tolerance table 2221. As shown in FIG. 7, for the female threads, the tolerance table 2221 stores the dimensional range of the radius of the circle to be machined (argument I), values of the instructed argument (argument K), and a tolerance standard for thread holes in association with each other.

The setting unit 212 reads the tolerance of the circle to be machined associated with the radius of the circle to be machined (argument I) and the tolerance class of the circle to be machined (argument K) from the tolerance table 2221. The setting unit 212 sets the compensation amount of the effective diameter of the circle to be machined based on the read tolerance of the circle to be machined and the ratio of the tolerance of the circle to be machined (argument L) in the machining program.

Specifically, when the argument I is 3.0, the argument K is 2.2, and the argument L is 70, for example, the setting unit 212 reads the tolerance 8 to 0 (μm) of the circle to be machined associated with the arguments I, K, and L from the tolerance table 2221.

When the read tolerance of the circle to be machined is 8 to 0 (μm) and the ratio of the tolerance of the circle to be machined (argument L) is 70 ( ), the setting unit 212 sets the compensation amount of the effective diameter of the circle to be machined to 8×0.7=5.6 (μm).

Although the tolerance table 2221 shown in FIG. 7 is for the female threads, the tolerance storage 222 also has a tolerance table for the male threads (not shown) just like the tolerance table for the female threads.

Although the data table 2211 shown in FIG. 4 and the data table 2112 shown in FIG. 5 have been described in the embodiment, the data table is not limited to these data tables. The data table is prepared in advance for each nominal diameter, and the setting unit 212 can set the compensation amount of the effective diameter of the circle to be machined using the data table for each nominal diameter. The data table is not limited to have the format described above, and may have, for example, a subprogram format.

As described above, the numerical control device 2 of the present embodiment includes: the instruction unit 211 that instructs the standard of the circle to be machined, the ratio of the compensation amount of the effective diameter of the circle to be machined, the tolerance class of the circle to be machined, and the ratio of tolerance of the circle to be machined in the machining program that causes the machine tool to perform the threading; and the setting unit 212 that sets the compensation amount of the effective diameter of the circle to be machined based on the standard of the circle to be machined, the ratio of the compensation amount of the effective diameter of the circle to be machined, the tolerance class of the circle to be machined, and the ratio of the tolerance of the circle to be machined.

Thus, the numerical control device 2 can easily set the compensation amount of the effective diameter of the circle to be machined, so that the threading using the compensation amount of the effective diameter of the circle to be machined can be performed within the tolerance of the standard such as JIS or ISO.

The instruction unit 211 instructs the standard of the circle to be machined as the argument in the machining program. The setting unit 212 sets the compensation amount of the effective diameter of the circle to be machined based on the standard of the circle to be machined. Thus, the numerical control device 2 can suitably set the compensation amount of the effective diameter of the circle to be machined using the standard of the circle to be machined.

The setting unit 212 reads the compensation amount of the effective diameter of the circle to be machined associated with the radius of the circle to be machined, the pitch of the circle to be machined, and the standard of the circle to be machined from the standard storage 221 and sets the read compensation amount of the effective diameter of the circle to be machined. Thus, the numerical control device 2 can suitably set the compensation amount of the effective diameter of the circle to be machined using the radius, pitch, and standard of the circle to be machined.

The instruction unit 211 instructs the ratio of the compensation amount of the effective diameter of the circle to be machined as the argument in the machining program. The setting unit 212 sets the compensation amount of the effective diameter of the circle to be machined based on the ratio of the compensation amount of the effective diameter of the circle to be machined. Thus, the numerical control device 2 can set the ratio reflected on the compensation amount within the range of the standard values.

The instruction unit 211 instructs the radius of the circle to be machined and the tolerance class of the circle to be machined as the arguments in the machining program, and the setting unit 212 reads the tolerance of the circle to be machined associated with the radius of the circle to be machined and the tolerance class of the circle to be machined from the tolerance storage 222. The setting unit 212 sets the compensation amount of the effective diameter of the circle to be machined based on the read tolerance of the circle to be machined and the ratio of the tolerance of the circle to be machined. Thus, the numerical control device 2 can set the tolerance of the circle to be machined reflected on the compensation amount within the range of the standard values.

The numerical control device 2 described in the embodiments of the present invention can be implemented by hardware, software, or a composition of the hardware and the software. A control method achieved by the numerical control device 2 can also be implemented by hardware, software, or a combination of the hardware and the software. The expression "implemented by the software" means that a computer reads and executes a program to implement the functions of the control system or the control.

The program is stored in various types of non-transitory computer readable media and supplied to the computer. The non-transitory computer readable media include various types of tangible storage media. Examples of the non-transitory computer readable media include a magnetic recording medium (e.g., a hard disk drive), a magneto-optical recording medium (e.g., a magneto-optical disk), a compact disc read only memory (CD-ROM), a CD-R, a CD-R/W, and a semiconductor memory (e.g., a mask ROM, a programmable ROM (PROM), an erasable PROM (EPROM), a flash ROM, and a random access memory (RAM)).

The embodiments have been described above as advantageous embodiments of the present invention, but the scope of the present invention is not limited to the embodiments. Various types of modifications can be made without departing from the spirit of the present invention.

EXPLANATION OF REFERENCE NUMERALS

1 Machining system
2 Numerical control device
3 Machine tool
211 Instruction unit
212 Setting unit
221 Standard storage
222 Tolerance storage

The invention claimed is:

1. A numerical control device comprising:

an instruction unit that instructs a standard or tolerance class of a machining circle and a ratio of a tolerance of the machining circle in a machining program that causes a machine tool to perform threading or circular machining; and a setting unit that sets a compensation amount of an effective diameter of the machining circle based on the standard or tolerance class of the machining circle and the ratio of the tolerance of the machining circle, wherein the numerical control device controls a cutting tool of the machine tool to perform the threading or the circular machining based on the set compensation amount, and wherein the effective diameter is defined by Japanese Industrial Standards (JIS) or International Organization for Standardization (ISO).

2. The numerical control device according to claim 1, wherein the instruction unit instructs the standard of the machining circle as an argument in the machining program, and the setting unit sets the compensation amount of the effective diameter of the machining circle based on the standard of the machining circle.

3. The numerical control device according to claim 1, wherein the standard or tolerance class of the machining circle is an industrial standard for threads or deviations of threads in commonly used fits.

4. The numerical control device according to claim 1, further comprising: a standard storage that stores a radius of the machining circle, a pitch of the machining circle, a standard of the machining circle, and the compensation amount of the effective diameter of the machining circle in association with each other, wherein the setting unit reads the compensation amount of the effective diameter of the machining circle associated with the radius, pitch, and standard of the machining circle from the standard storage and sets the read compensation amount of the effective diameter of the machining circle.

5. The numerical control device according to claim 1, wherein the instruction unit instructs a ratio of the compensation amount of the effective diameter of the machining circle as an argument in the machining program, and the setting unit sets the compensation amount of the effective diameter of the machining circle based on the ratio of the compensation amount of the effective diameter of the machining circle.

6. The numerical control device according to claim 1 further comprising: a tolerance storage that stores a radius of the machining circle, the tolerance class of the machining circle, the tolerance of the machining circle in association with each other, wherein the instruction unit instructs the radius of the machining circle and the tolerance class of the machining circle as the arguments in the machining program, and the setting unit reads the tolerance of the machining circle associated with the radius and tolerance class of the machining circle from the tolerance storage, and sets the compensation amount of the effective diameter of the machining circle based on the read tolerance of the machining circle and the ratio of the tolerance of the machining circle.

* * * * *